United States Patent
Voss

[19]

[11] Patent Number: 5,939,173
[45] Date of Patent: Aug. 17, 1999

[54] CELLULAR MATERIAL STRIP

[75] Inventor: Klaus-Wilhelm Voss, Uetersen, Germany

[73] Assignee: Vosschemie GmbH, Uetersen, Germany

[21] Appl. No.: 08/699,163

[22] Filed: Aug. 16, 1996

[30] Foreign Application Priority Data

Jul. 24, 1996 [DE] Germany ............. 296 12 759 U
Aug. 6, 1996 [DE] Germany ............. 296 13 594 U

[51] Int. Cl.$^6$ ..................................... B32B 3/02
[52] U.S. Cl. ................. 428/158; 428/220; 428/317.1; 428/317.3
[58] Field of Search ............. 428/304.4, 317.1, 428/317.3, 158, 159, 220

[56] References Cited

U.S. PATENT DOCUMENTS

| | | | |
|---|---|---|---|
| 1,524,335 | 1/1925 | Brown | 428/317.1 |
| 4,603,241 | 7/1986 | Nardi | 200/86 R |
| 4,734,323 | 3/1988 | Sato et al. | 427/317.3 |
| 4,927,695 | 5/1990 | Ooms et al. | 428/159 |
| 4,943,467 | 7/1990 | Shuji | 428/159 |
| 5,054,241 | 10/1991 | Mishima et al. | 49/488 |
| 5,080,955 | 1/1992 | Van Rens | 428/317.3 |
| 5,556,672 | 9/1996 | Akachi et al. | 428/304.4 |
| 5,630,980 | 5/1997 | von Arndt et al. | 264/154 |
| 5,686,174 | 11/1997 | Irrgeher | 428/304.4 |

Primary Examiner—Allan R. Kuhns
Attorney, Agent, or Firm—Friedrich Kueffner

[57] ABSTRACT

The present invention relates to a cellular material strip (100,200,300,400), whose surface is partly provided with an adhesive coat (10). The cross section of the cellular material strip, according to the invention, is comprised of the following: a first, in particular isosceles trapeze (12) with a first height (14) and a first long and a first short datum line (16,18), a rectangle (20) with long and short sides (22,24, 26), in which case a first long side (22) of the rectangle terminates flush with the first long datum line (16) of the first trapeze (12), and a second, in particular isosceles trapeze (28) with a second height (30) and a second long and a second short datum line (32,34), in which case the second long datum line (32) of the second trapeze (28) terminates flush with a second long side (24) of the rectangle (FIG. 1).

23 Claims, 12 Drawing Sheets

CELLULAR MATERIAL STRIP

The invention relates to a cellular material strip, whose surface is partly provided with an adhesive coat as well as to a configuration of such cellular material strips and to an applicator for the fitting of the cellular material strip into the gap, more especially between two body portions of a vehicle.

BACKGROUND OF THE INVENTION

It is known for such cellular material strips to be employed as sealing strips for gaps, in particular when motor vehicle body portions are enamelled. These are normally of cylindrical construction, i.e. their cross-sectional surface area is circular or elliptical. However, with this profile section it has proved to be disadvantageous that the requisite adhesion surfaces, when the profile section is insertingly fitted for sealing the gap, are no longer available in the form of adhesion surface areas to their full cross-sectional extent for, in the case of a cylindrical round profile section, when a self-detaching adhesive is used, those adhesion surface area which are provided as adhesion surface areas, are reduced to such an extent that the full adhesion surface area is no longer available, which is caused by the cylindrically round profile section.

It has to be considered, furthermore, that ultimately, for the sealing of the gap, the cellular material section has to be pressed into the gap in order that the closure of the gap be achieved. However, since a cellular material section which is subjected to pressure endeavors to return to its original configuration, i.e. to reassume its initial shape, this leads to the circumstance that no plane surface area provided with adhesive area comes to bear against the body portion concerned which is adequate for a secure fixation of the strip.

Over and above that, after having been pressed into the gap, the round section fails to adapt ideally to all gap widths.

That is why the technical problem of the present invention is to provide a cellular material strip of the type stated in the foregoing not merely for the sealing of gaps between body and doors or hatchbacks or the like of vehicles, but also for so-called further or additional enamellings of vehicle body portions, which, with a simple construction, ensures as good a utilization as possible of the applied adhesive coat. In addition, the technical problem is to provide an applicator, with the aid of which cellular material strips can be effortlessly fitted into the gap, more particularly into a gap between two body portions of a motor vehicle.

SUMMARY OF THE INVENTION

This technical problem is resolved in a cellular material strip of the aforementioned type providing the cellular material strip with a cross-section which, consecutively, is comprised of the following, a first, in particular, isosceles trapezoid possessing a first height and a first long and a first short datum line, a rectangle possessing long and short sides, wherein a first long side of the rectangle terminates flush with the first long side of the trapeziod, and a second, in particular, isosceles trapezoid possessing a second height and a second long and a second short datum line, wherein the second long datum line of the second trapeziod terminates flush with a second long side of the rectangle.

This offers the advantage that the adhesion surface area provided remains available in its full size so that a large surface area is available. Moreover, this section, with its more strongly deformable narrow cross section at the top and the geometrically wider base, which also carries the adhesive, shows an ideal deformation and adaptation and adhesion behavior with different gap thicknesses.

An especially large, constant adhesion surface area is obtained in that the adhesive coat completely covers the first short datum line.

A cellular material strip of this type is employed in a particularly advantageous manner for the sealing of gaps or in the form of a sealing element, more particularly for the sealing of gaps or joints between a fixed body portion and a movable body portion of motor vehicles.

In a configuration of such cellular material strips provision is made for at least two cellular material strips to be aligned relative to each other in such a way that, in each case, two short sides of the rectangles of the respective cellular material strips are oriented so as to be reciprocally aligned, while the cellular material strips, at these locations of the joints, are interconnected by means of a tear-off bridge so as to form a chain.

In order to be able to fit a cellular material strip into the gap, e.g. between the body of a vehicle and a door of the latter, the invention provides an applicator which is comprised of a rod-like grip or handle, one of the free ends of which carries a claw-like mounting means, said claws engaging around and holding the cellular material strip in such a way as to leave its adhesive surface area exposed.

The specially designed cellular material strips can also be employed when so-called further or additional enamellings of body portions are carried out. If only a small area has to be repaired, then the cellular material strip is used as terminal part of a protectively covered region. In such a case it is possible to prevent the formation of an edge. Such a so-called further or additional enamelling without edge formation and without employing this cellular material strip calls for a high degree of proficiency in the handling of the spray gun. When use is made of the cellular material strip, such a so-called further or additional enamelling can be effortlessly performed and this by unskilled staff. The special advantage of this consists in that the adhesive surface area of the cellular material strip according to the invention rests several times wider on the body portion surface in comparison with a known cylindrical cellular material strip possessing a circular cross section. The narrow zone being produced in these so-called further or additional enamellings, in which the paint mist occurs in the form of tiny droplets and, for that reason, renders the same somewhat dull, is equalized by polishing so that an invisible transition area from the old to the new enamel is produced.

Since, in the case of a circular section profile of the known cylindrical cellular material strip the adhesion surface area is clearly reduced already a short while after the fitting and pressing operation, in the course of which the cellular material strip becomes somewhat oval, for the adhesive is at all times a self-detaching adhesive and the round section profile endeavors to reassume its original round configuration, this leads to the 2 mm or 3 mm wide adhesive surface area being significantly reduced in size on account of the redetachment effect due to the force of the round profile section. However, in the course of the so-called further or additional enamelling, the spray gun produces an air pressure so that the risk of the strip becoming detached from the substratum during the enamelling process does exist, something which has to be prevented at all events because it would result in a damage that is almost impossible to repair.

In order to avoid this drawback, the straight adhesive surface in the cellular material strip according to the invention is especially advantageous. Consequently, the tear-off and contact bridge, thus the projecting 4.2 mm or 5.5 mm, is also ideal for a delimitation against paint mists without any edge formation.

Further advantageous constructions are characterized in the subclaims.

BRIEF DESCRIPTION OF THE DRAWINGS

In the following, the invention is explained in greater detail with the aid of the drawings. Thus

DETAILED DESCRIPTION OF THE PREFERRED EMBODIMENT

Figure 1:
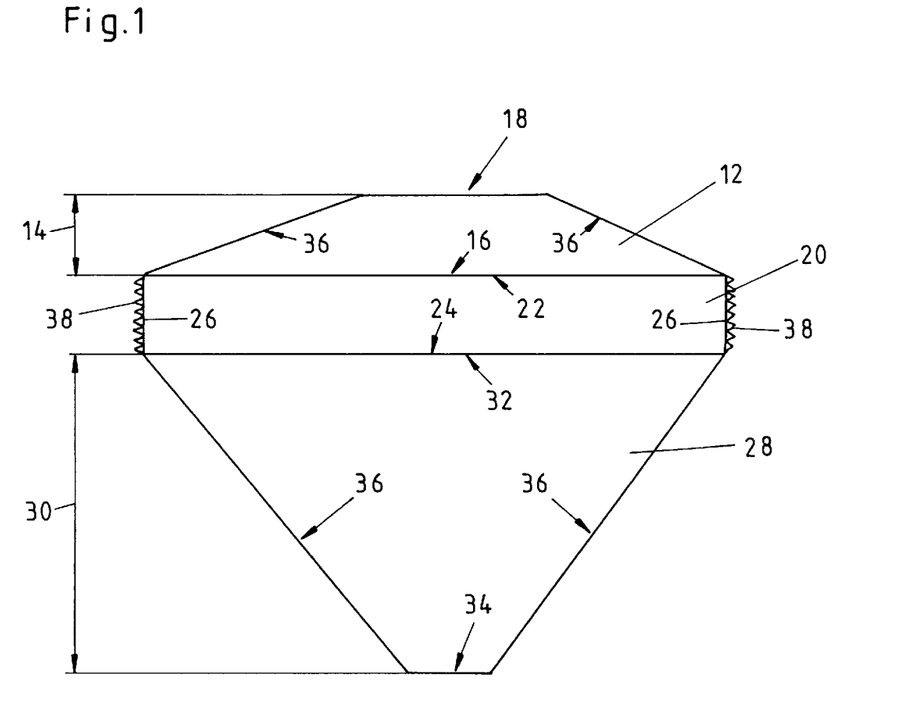
FIG. 1 shows a basic depiction of the cross section of a symmetrical cellular material strip.

FIG. 1 shows in a sketch-like manner the principal composition of the cross-sectional surface area of a symmetrical celluar material strip 100,200,300,400. When viewing FIG. 1 from the top toward the bottom, the cross-sectional surface area is composed of the following:

A first isosceles trapeziod 12 forms a top section. This trapeziod 12 comprises a first short datum line 18, a first long datum line 16 and non-parallel sides 36.

A rectangle 20 with a first long side 22, a second long side 24 and short sides 26 follows the first long datum line 16. The first long side 22 terminates flush with the first long datum line 16.

A second trapeziod 28 follows the second long side 24 of the rectangle 20. This second trapeziod 28 comprises a second long datum line 34 and non-parallel sides 36. The second long datum line 32 terminates flush with the second long side 24 of the rectangle 20.

On the sort sides 26 of the rectangle 20, the remnants of tear-off bridges 38 are visible. These result from configurations of such cellular material strips, which will be described later hereinafter.

The trapeziod 12 and 28 each possess a height 14 and 30. The choice of this height substantially determines the appearance and the type of the cross section of the cellular material strip 100,200,300,400.

The height 14, in comparison with the height 30, is dimensioned so as to be smaller or identical, in which case the height 14 is 1.15 mm to 2 mm, more aprticularly though 1,5 mm or 2 mm, while the height 30 is 10.5 mm to 20 mm, more particularly, though, 10.5 mm, 13 mm or 20 mm, especially since it is possible for the cellular material strips to be fabricated up to an overall height of 23 mm and even more. The length of the short sides 26 of the rectangle 20 of the cellular material strip can in this case be 1 mm to 5 mm, more particularly, though, 2 mm. The length of the short datum line 18 ranges from 1 mm to 10 mm, more particularly, though, 6 mm, while the length of the long datum line 16 may range from 2 mm to 20 mm, more particularly, though, 17 mm or 28 mm. The length of the short datum line 34 ranges from 1 mm to 5 mm, more particularly, though, 3 mm. The ratio of the height 14 relative to the height 30 is preferably 0.1 mm to 0.5 mm, more particularly, though, 0.11 mm or 0.12 mm.

Figure 2:
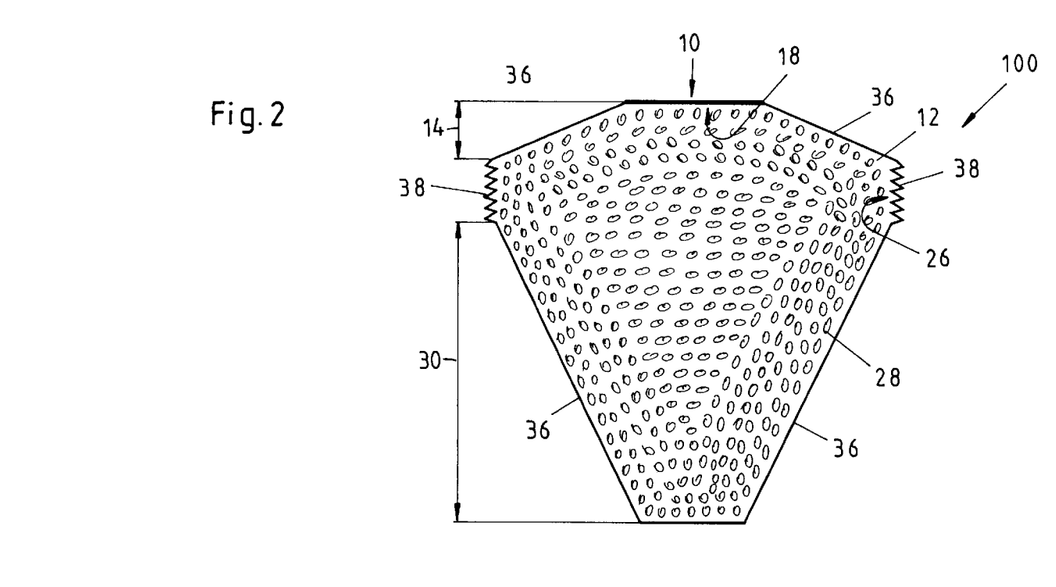
FIG. 2 shows a sectioned view of a first preferred embodiment of a symmetrical cellular material strip.
Figure 4:
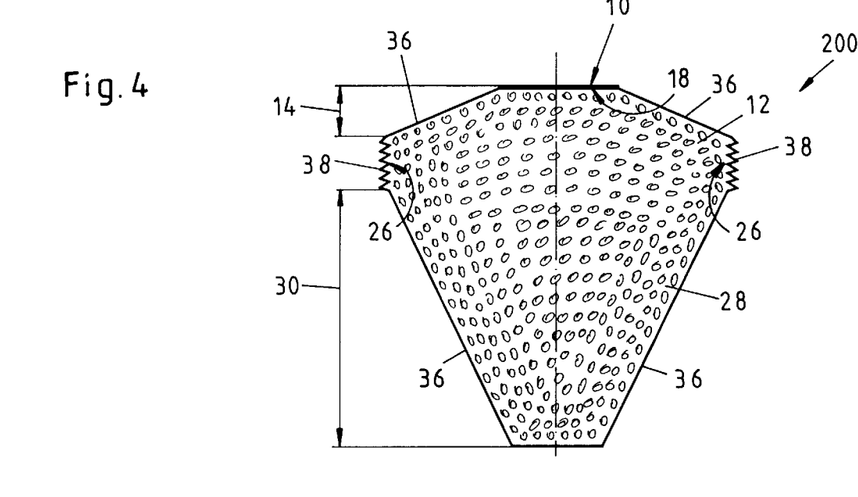
FIG. 4 shows a sectioned view of a second preferred ambodiment of a symmetrical cellular material strip.

The components of the cross section of a symmetrical cellular material strip depicted schematically above result in a cross section illustrated in the FIGS. 2 and 4. In this case the first short side is covered with an adhesive coat 10.

The coating of the base 18 of the trapezoidal cellular material strip with an adhesive is only able to extend over the entire base 18, which is normally coated with the adhesive in a width of 6 mm. This coating can also be reduced to 2 mm to 3 mm. The application of an adhesive can also extend over the base 18 up to the area 36 adjoining the base 18.

The two embodiment examples 100 and 200 of the FIGS. 2 and 4 differ essentially in the dimensional design of the trapeziods 12 and 28.

In the embodiment 100 illustrated in the FIG. 2, the heights 14 and 30 of the first and the second trapeziod 12 and 28 are greater than in the embodiment 200 depicted in the FIG. 4. Furthermore, in the first embodiment 100, the lengths of the first and the second long datum lines 16 and 32 (FIG. 1) are greater than in the second embodiment 200.

Figure 3:
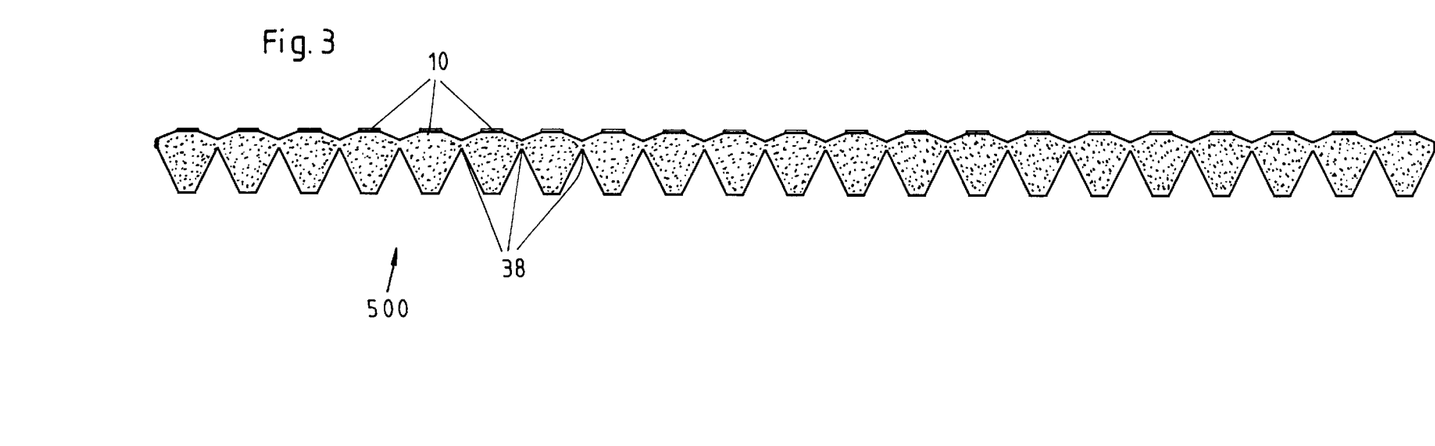
FIG. 3 shows a sectioned view of a configuration of cellular material strips according to the first embodiment of FIG. 2.
Figure 5:
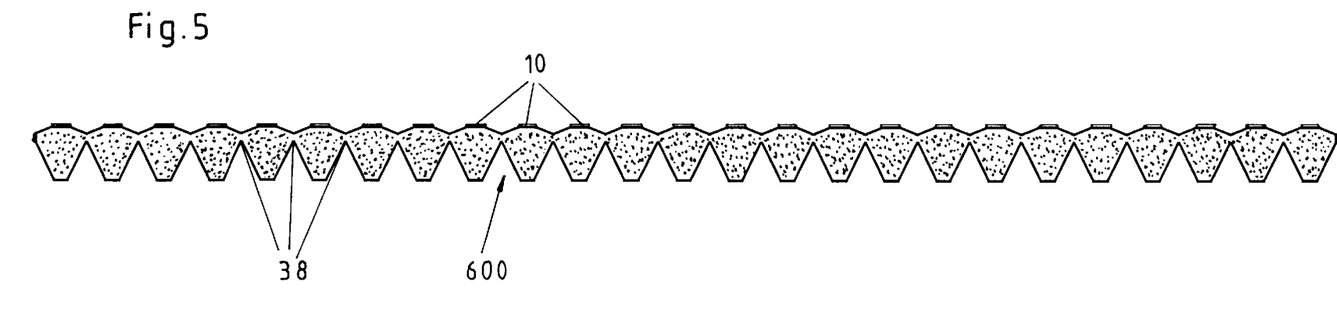
FIG. 5 shows a sectioned view of a configuration of cellular material strips according to the second embodiment of FIG. 4.

The FIGS. 3 and 5 show configurations 500,600 of the first and the second embodiment 100,200 in the form of long chains. The cellular material strips 100,200 meet in this case with the short sides of their rectangles 20 (FIG. 1), tear-off bridges 38 being provided at these locations of the joint.

When employing the cellular material strips according to the invention in the gap sealing of e.g. body and door of a motor vehicle, these cellular material strips in the form of such chains are made available. If required, successive cellular material strips are then torn off at the tear-off bridges 38 and placed into a gap.

Figure 6:
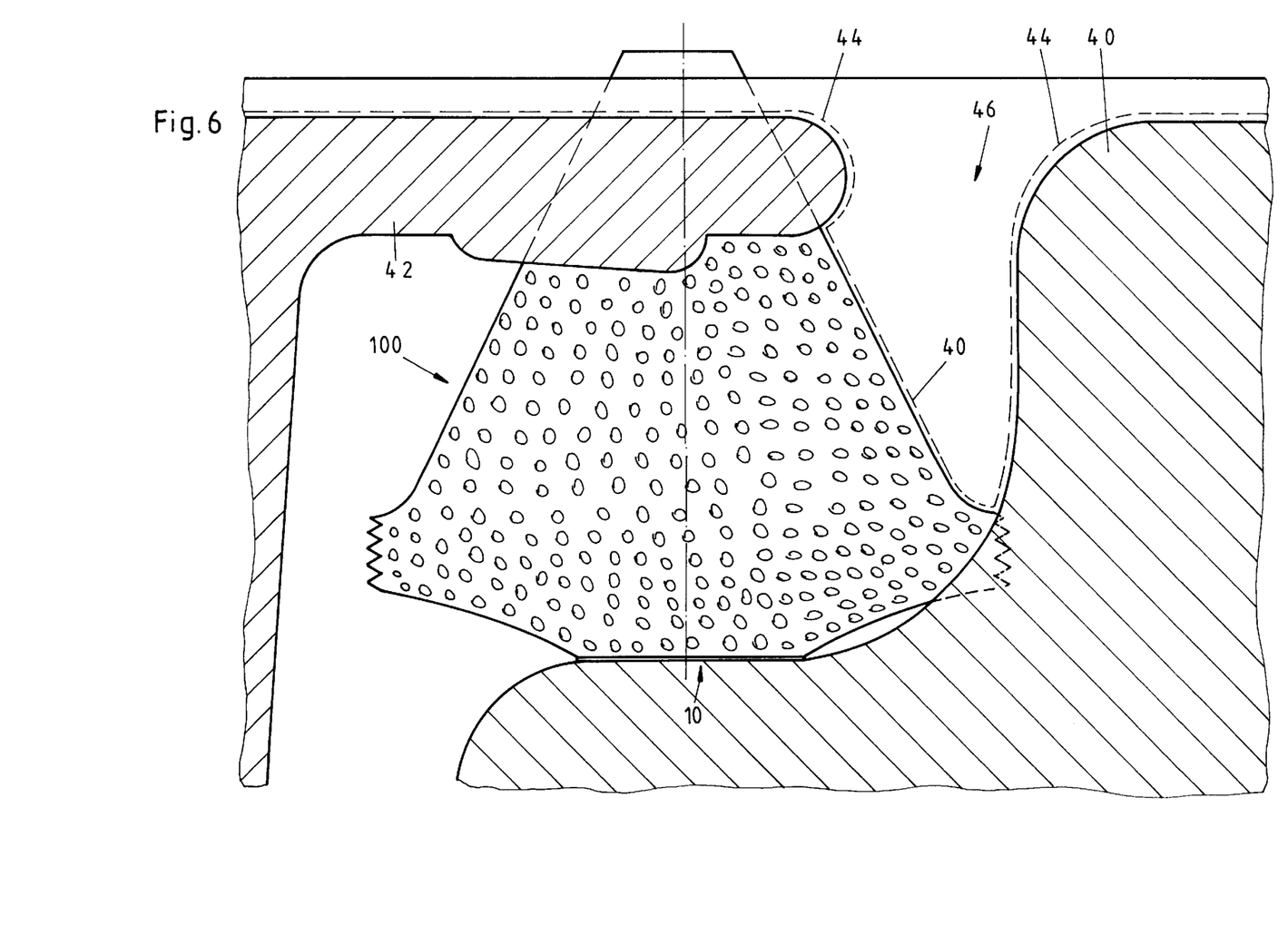
FIG. 6 shows a sectioned view of the employment of a cellular material strip according to the first embodiment of FIG. 2 for the sealing of a gap.
Figure 7:
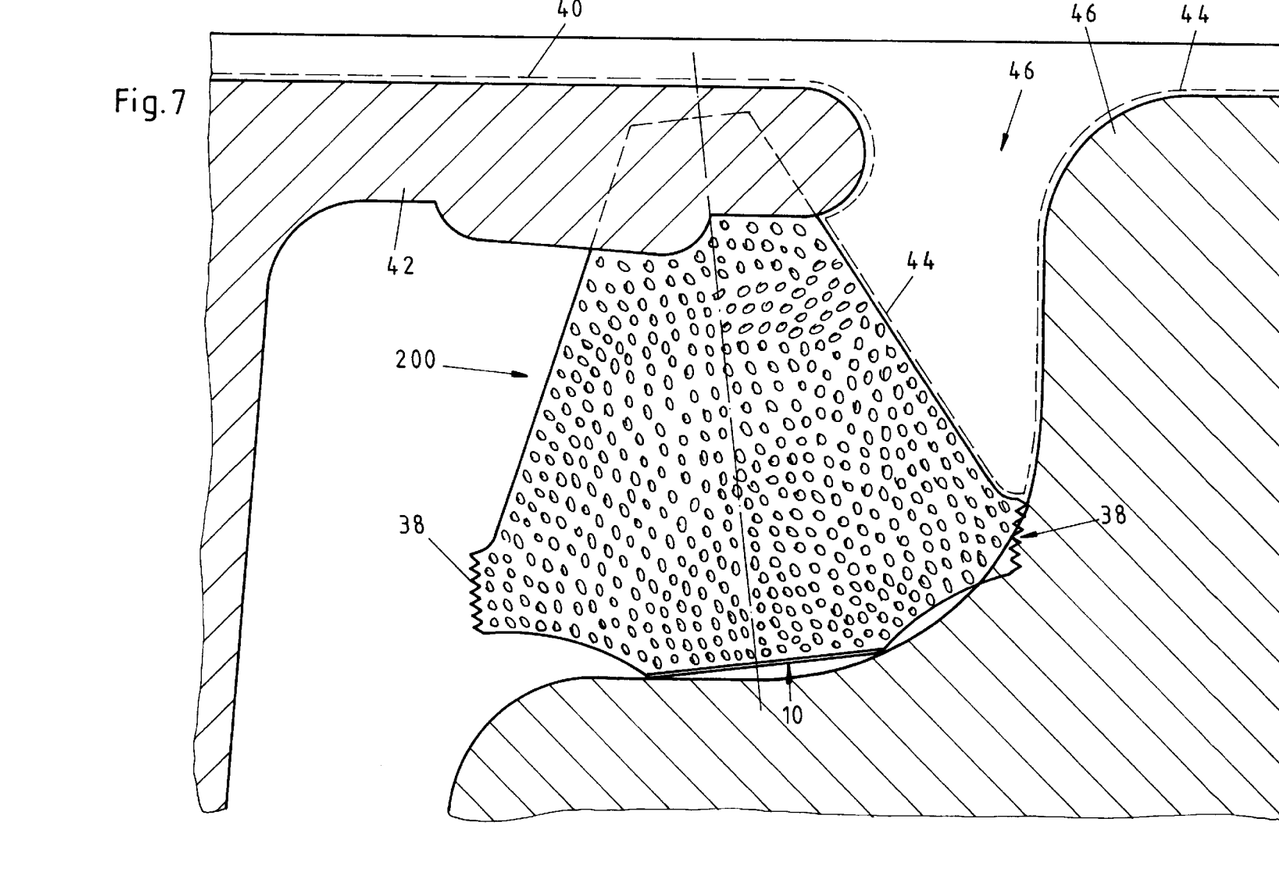
FIG. 7 shows a sectioned view of the employment of a cellular material strip according to the second embodiment of FIG. 4 for the sealing of a gap.

The disposition or placement of the cellular material strips 100,200 according to the invention into a gap 46 is depicted in the FIGS. 6 and 7, in each case with the first embodiment 100 or with the second embodiment 200. A gap 46 between a door 42 and a body 40 is sealed with the aid of an inserted cellular material strip 100,200 so that, when the body 40 and the door 42 are enamelled, no enamel is able to penetrate into the gap.

The cellular material strip 100,200 is fixed on the body with the aid of an adhesive strip 10. By closing the door or by pressing the cellular material strip into the gap 46, the first is compressed and comes into firm contact with the body 40 and the door 42. This seals the gap 46. In the course of the subsequent enamelling operation, the enamel 44 is not only deposited on the body 40 and the door 42, but, in the manner illustrated in the FIGS. 6 and 7, also on the cellular material strip 100,200. In this way a penetration of enamel 44 into the gap 46 is prevented.

Figure 8A:
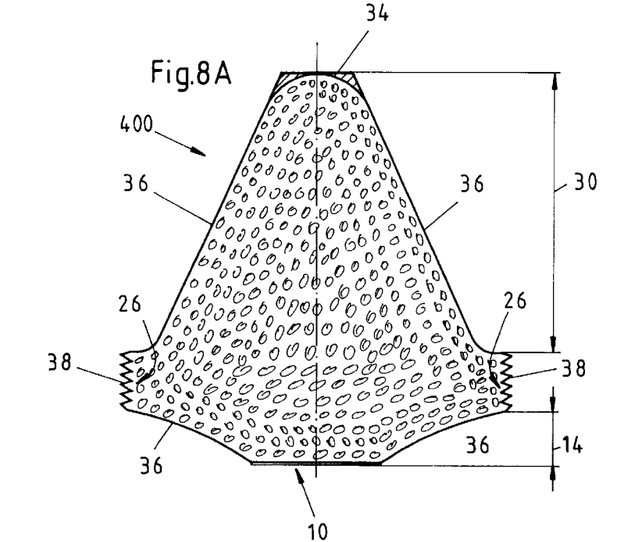
FIG. 8A shows a sectioned view of a third embodiment of a symmetrical cellular material strip.
Figure 8B:
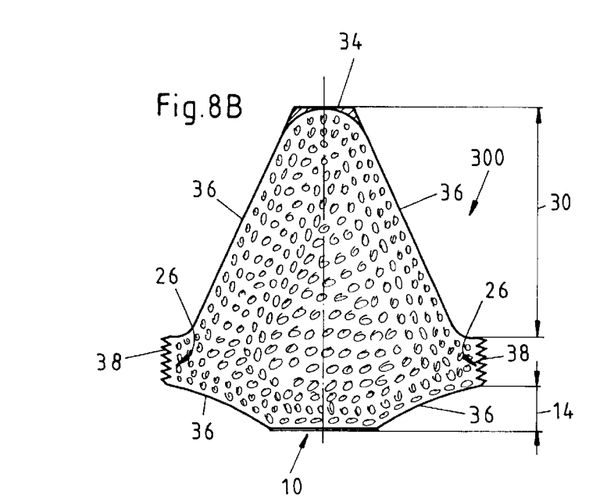
FIG. 8B shows a sectioned view of a fourth embodiment of a symmetrical cellular material strip.

The FIGS. 8A and 8B depict in each case a third and a fourth embodiment 300,400, respectively, of a cellulat material strip according to the invention. These correspond essentially with the first and the second embodiment 100 and 200 with the difference that the non-parallel sides 36 are not constructed so as to be straight, but curved. In addition, the second short datum line 34 is likewise rounded off.

Figure 9A:
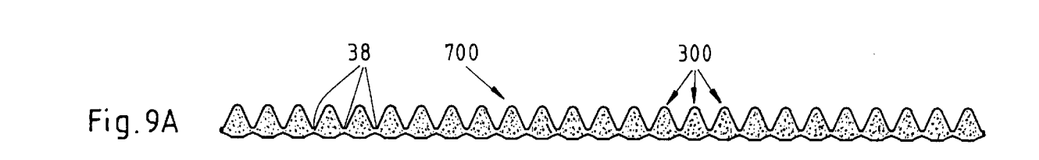
FIG. 9A shows a sectioned view of a configuration of cellular material strips according to the third ambodiment of FIG. 8A.
Figure 9B:
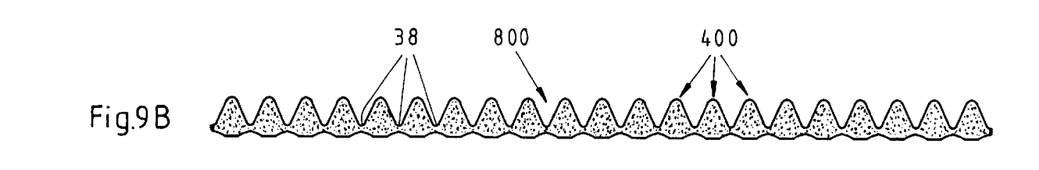
FIG. 9B shows a sectioned view of a configuration of symmetrical cellular material strips according to the fourth embodiment of FIG. 8B.

The FIGS. 9A and 9B show in each case chain-like configurations of cellular material strips according to the third and fourth embodiment 300 and 400 analogously to FIGS. 3 and 5. Once again the individual cellular material strips 300,400 meet with the respective short sides 26 of the rectangle 20 (confer FIG. 1).

By virtue of the different dimensions of the cellular material strips 300 and 400, in FIG. 9A, a chain length of 350 mm corresponds to 25 cellular material sections 300 and in FIG. 9B, a chain length of 357 mm corresponds to 21 cellular material sections 400.

It is clear that the trapezes 12 and 28 do not necessarily have to be isosceles. Possible are also asymmetrical trapeziods 12 and 28, by way of example, for the adaptation to special gaps to be sealed. Such an asymmetric section 900 is illustrated in the FIGS. 10 and 11.

Figure 10:
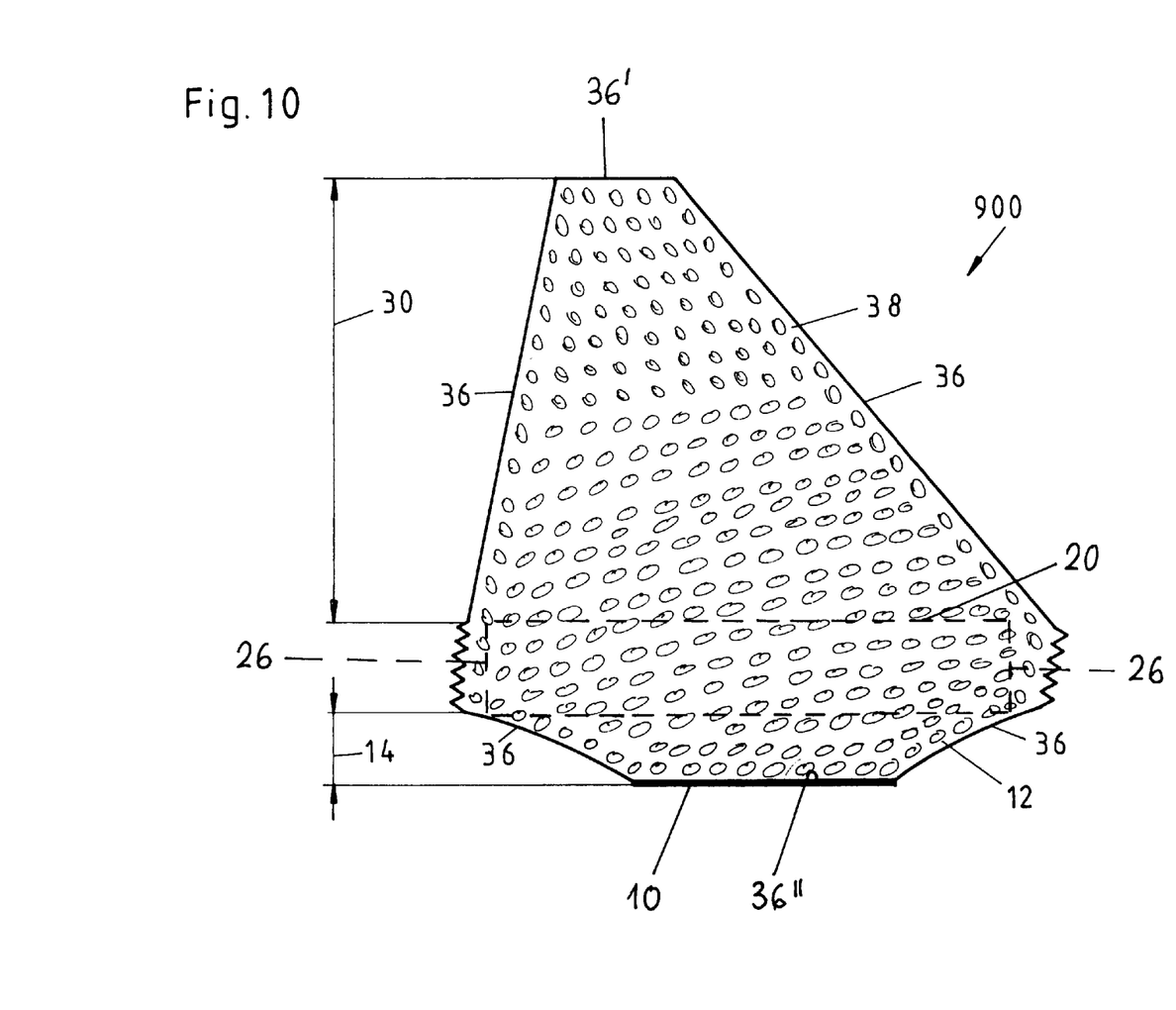
FIG. 10 shows a sectioned view of a fifth embodiment of a symmetrical cellular material strip.
Figure 11:
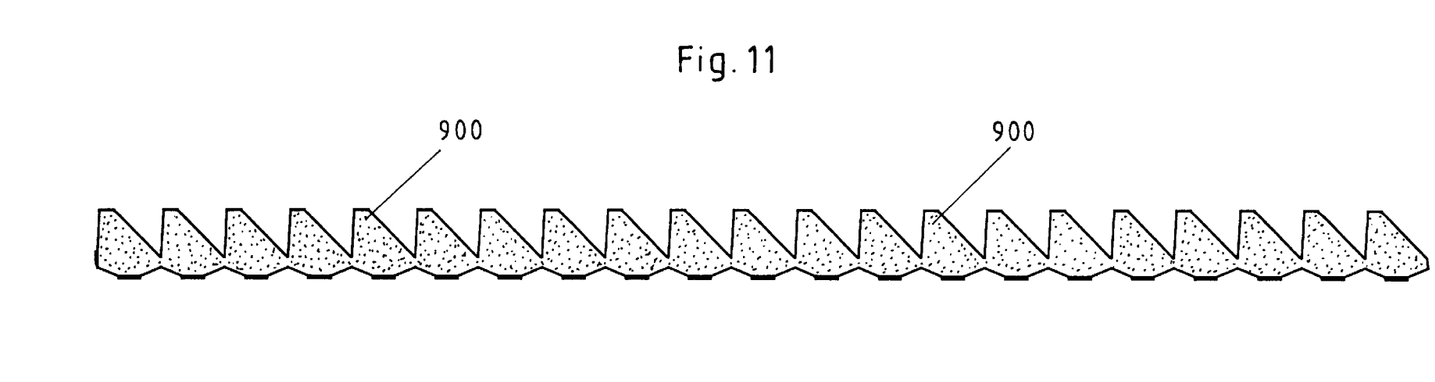
FIG. 11 shows a sectioned view of a configuration of symmetrical cellular material strips according to the fifth embodiment of FIG. 10.

FIG. 11 shows a chain-like configuration of asymmetric cellular material strips 900. Here, too, the individual cellular material strips 900 meet at the respective short sides 26 of the rectangle 20 (FIG. 10).

Figure 12:
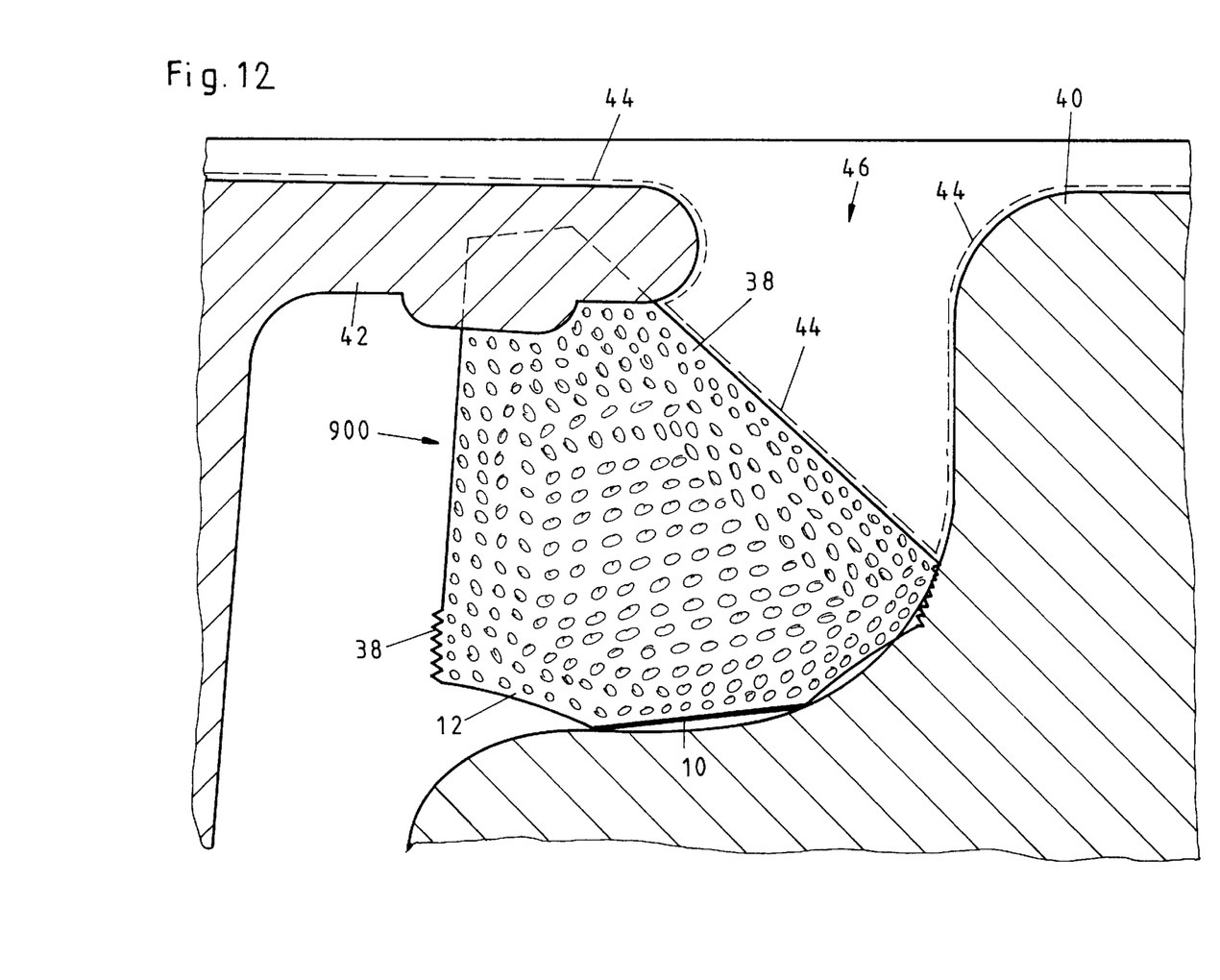
FIG. 12 shows a sectioned view of the employment of a cellular material strip according to the fifth embodiment of FIG. 10 for the sealing of a gap.

FIG. 12 depicts the configuration of the cellular material strip 900 in a gap 46 analogously to the FIGS. 6 and 7.

Figure 13:
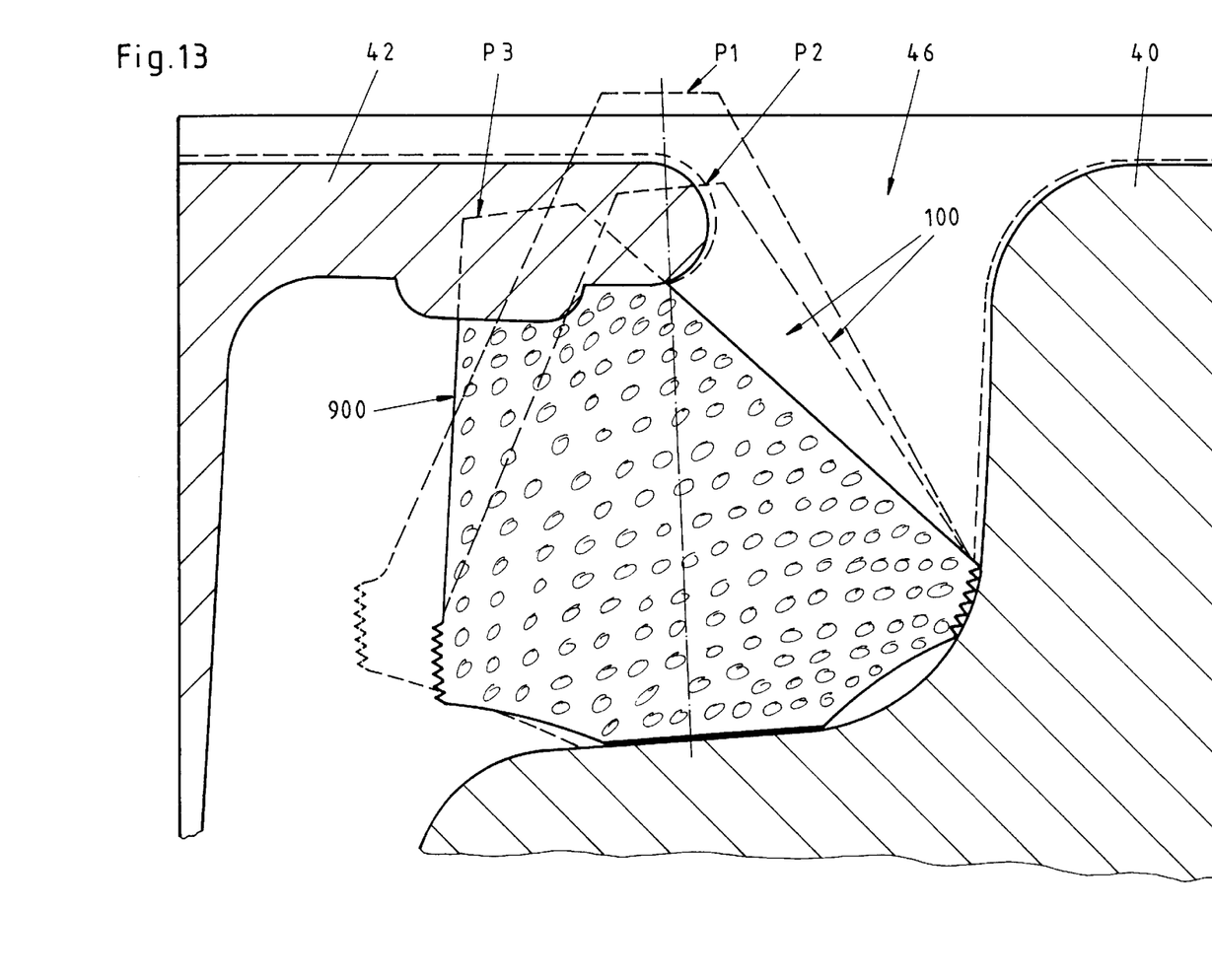
FIG. 13 shows in a sectioned view the employment of symmetrical cellular material strips possessing different sectional profile dimensions and of an asymmetrical cellular material strip for the sealing of a gap.

FIG. 13 shows the employment of symmetrically constructed cellular material strips 100,200,300,400 possessing differing sectional dimensions and of an asymmetrical cellular material strip 900 for sealing a gap 46 between the body 40 of a vehicle and its door 42. P1 is the sectional profile of a symmetrical cellular material strip 100, e.g. possessing a lateral edge length of 17 mm, P2 is the sectional profile of a symmetrical cellular material strip 100, e.g. possessing a lateral edge length of 14 mm and P3 is the sectional profile of an asymmetrical cellular material strip 900 possessing a length of e.g. 14 mm within the region of the longest lateral edge of the two lateral edges of the sectional profile. The width of the gap is approximately 7 mm in the embodiment example illustrated in the FIG. 13.

Figure 14:
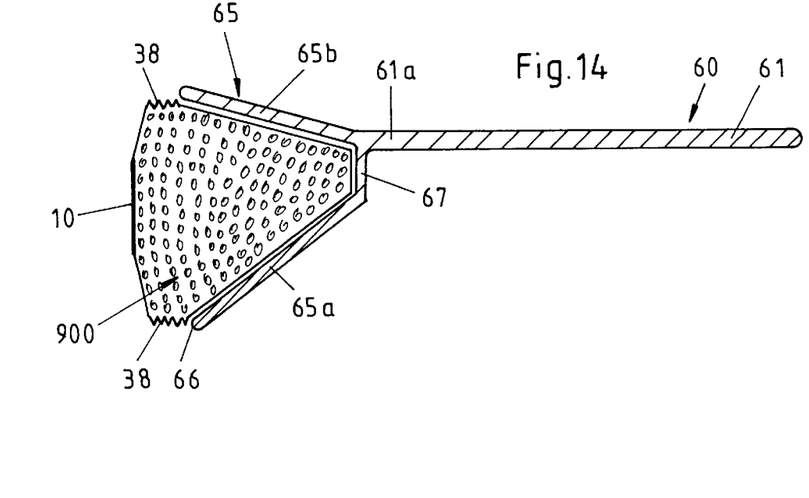
FIG. 14 shows a vertical section of an applicator with an asymmetrical cellular material strip seized by the same.
Figure 15:
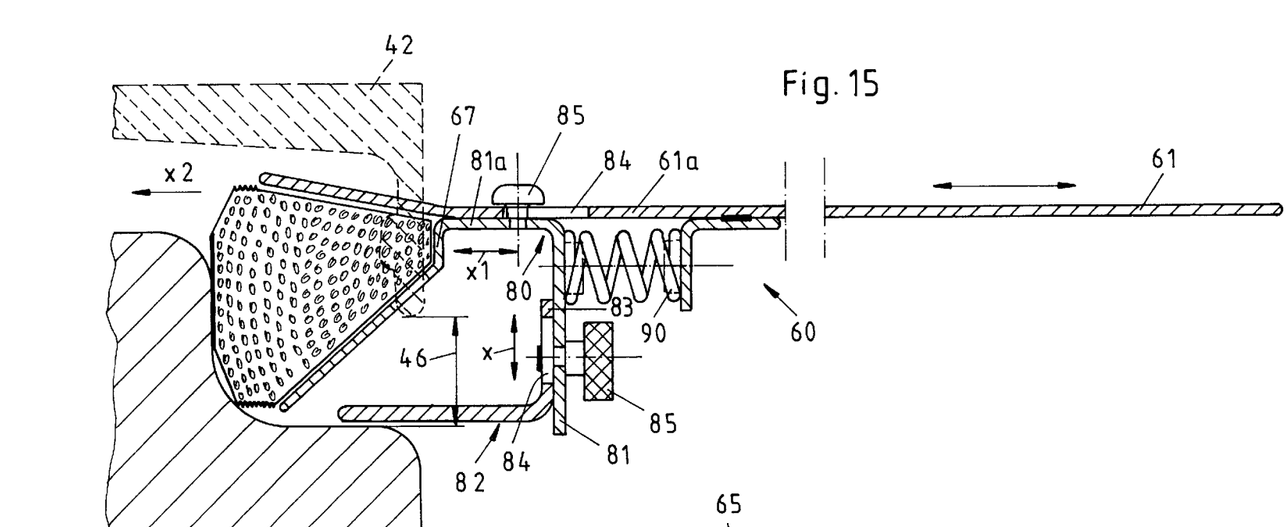
FIG. 15 shows a vertical section through an applicator for asymmetrical cellular material strips with door gap adaptation.

The fitting of a cellulat material strip 100,200,300,400 and 900 into the gap between two body portions of a vehicle, e.g. into the gap between a fixed body portion 40 and the door 42, is effected with the aid of an applicator 60 which, according to FIGS. 14 and 15, is comprised of a rod-like grip or handle 61 and of a claw-shaped mounting means 65 formed onto one end 61a of the grip or handle, which possesses two legs 65a, 65b constituting the claw, said claws being contoured and designed in such a way that a cellular material strip is insertable into the claw aperture 66 and is seized and retained by the two claw legs 65a, 65b, in which case the length of the two claw legs 65a, 65b is dimensioned in such a way that the adhesive coat 10 remains exposed and comes to rest on the side of the cellular material strip facing away from the grip 61 of the applicator 60 (FIG. 14). The space delimited by the claw legs 65a, 65b corresponds to the cross-sectional profile of the cellular material strip. A symmetrical construction of the two claw legs 65a, 65b makes the seizure of cellular material strips 100, 200,300,400 possessing a symmetrical sectional profile possible, whereas an asymmetrical design of the claw legs 65a, 65b is suitable for cellular material strips 900 possessing an asymmetrical sectional profile (FIGS. 14 and 15).

As depicted by the FIGS. 14 and 15, the two claw legs 65a, 65b of the mounting means 65 of the applicator 60 are disposed at an angle relative to each other so that both claw legs 65a, 65b correspond to the angular position of the two longitudinal side walls 36 of the cellular material strip 900 (FIG. 10), in which case both claw legs 65a, 65b are interconnected by means of a web 67, whose length corresponds to the length of the side wall 36' of the cellular material strip 900, which is located opposite the side wall 36" bearing the adhesive coat (FIG. 10) so that the mounting 65 seizes the cellular material strip 900 within the region of its longitudinal side walls 36 and of the side wall 36'. The cellular material strip 900 is thus securely retained in the mounting 65 and can be effortlessly introduced and fastened in the gap 46 between the two body portions 40,42 (FIG. 15).

The applicator 60 is comprised of plastic, metal (sheet metal) or some other suitable material. It is possible with this applicator 60 to incorporate the cellular material strips 100,200,300,400 and 900 well and effortlessly into the in each case special joint width between the door 42 and the body 40 of a vehicle. Because it is desirable to coat the door 42 with its sharp door edge in the full curve or roundness with enamel, this edge being particularly susceptible to damage.

The applicator 60 illustrated in the FIG. 15 is designed in such a way that an adjustability depending on the width of the gap 46 is possible. For this, on the grip 61, a first angle section 80 is mounted with a leg 81 disposed vertically to the grip 61, on which a second angle section 82 is retained with the aid of a setscrew 85. This leg 83 of the second angle section 82 is provided with an oblong hole 84, wherein the setscrew 85 is retained in such a way that, in the slackened state of the setscrew 85, the angle section 82 is displaceable in the direction of arrow X so that an adaptation to the width of the gap 46 is possible (FIG. 15).

With the aid of the setscrew 85, the angle section 82 can be locked in any position. In addition, the angle section 80 is, with its leg 81a, mounted on the grip 61 so as to be displaceable in the direction of arrow X1, in which case the free end of the leg 81 of the angle section 80, while forming the web-like section 67, passes into the claw leg 65a (FIG. 15) so that the possibility exists of altering the claw aperture 66 of the applicator 60 so as to be able to adapt to the sectional profile of the, in each case, cellular material strip 900 employed. Advantageously, the angle section 80 is subjected to the action of a spring 90, with the aid of which, when handling the applicator 60, the cellular material strip 900 is pressed in the direction of arrow X2 with its adhesive coat 10 urged against the body portion 40 when the cellular material strip 900 is fitted into the gap 46 (FIG. 15).

The applicator 60 illustrated in the FIGS. 14 and 15 is employable in a pertinent construction for symmetrical cellular material strips 100,200,300,400 according to the applicator for asymmetrical cellular material strips 900.

Figure 16:
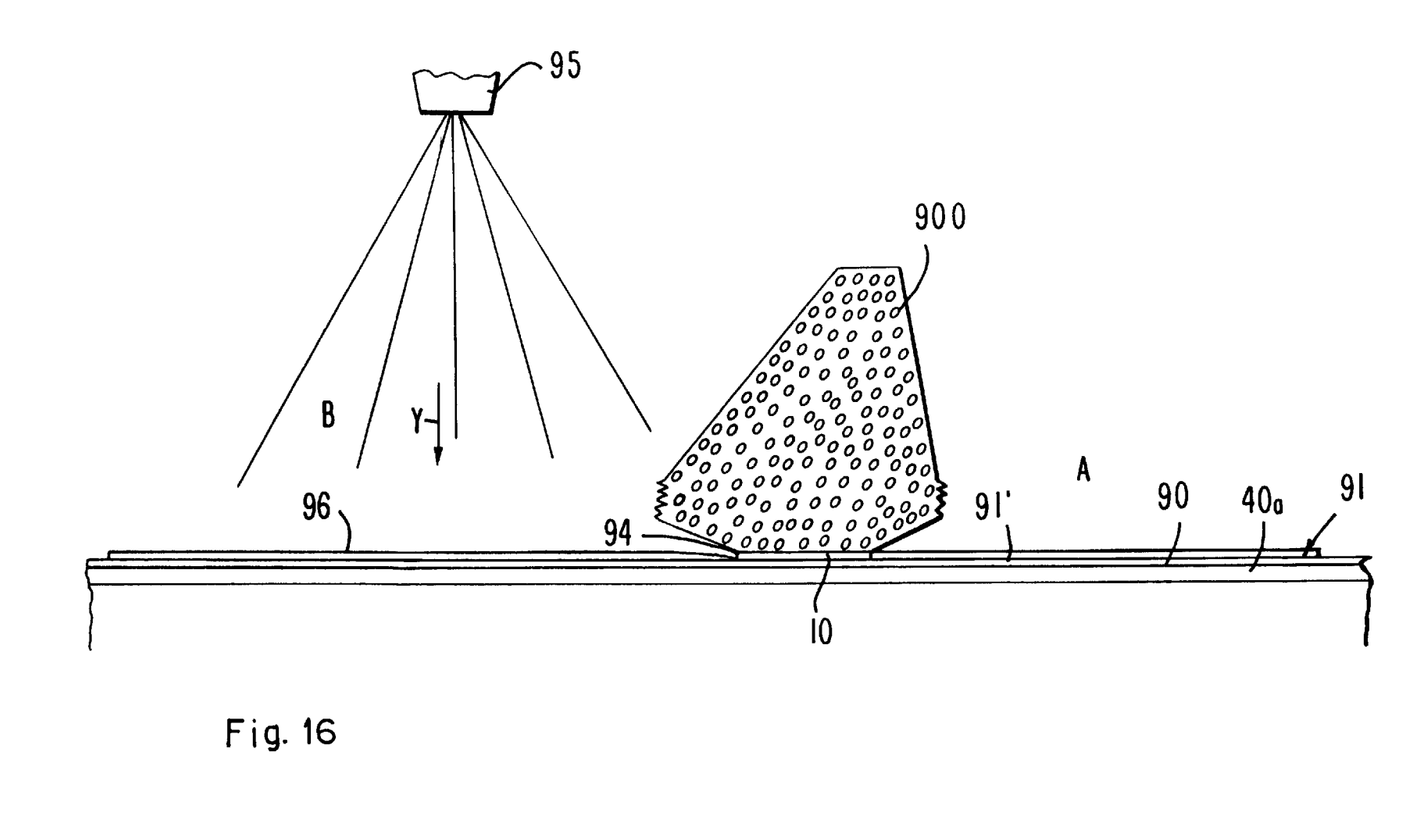
FIG. 16 shows in a side view the application of the cellular material strip in a so-called further or additional enamelling.

FIG. 16 shows the employment of a cellular material strip 900 in a so-called further or additional enamelling. A body sheet metal bearing an old enamel coat 90 is identified with 40a. The section A which is not to be provided with fresh enamel is covered with a paper or film section 91. A cellular material strip 900 is glued on with its adhesive coat 10 for delimiting the section B to be provided with new enamel. With the aid of an enamelling gun, which is indicated at 95, enamel is sprayed on in the direction of arrow Y onto the section B to be provided with fresh enamel. The new repair layer of enamel 96 is running out slowly at 94 and merges with the old coat of enamel 91'.

What is claimed is:

1. A cellular material strip comprising a surface partly covered with an adhesive coat, further comprising a cross-section consecutively composed of a first trapezoid having a first height and a first long datum line and a first short datum line, a rectangle having long sides and short sides, wherein a first long side of the rectangle extends flush and is coextensive with the first long datum line of the first trapezoid, and a second trapezoid having a second height and a second long datum line and a second short datum line, wherein the second long datum line of the second trapezoid extends flush and is coextensive with a second long side of the rectangle.

2. The cellular material strip according to claim 1, wherein the trapezoids are isosceles trapezoids.

3. The cellular material strip according to claim 1, wherein the first height is equal to or smaller than the second height.

4. The cellular material strip according to claim 1, wherein the first height is 1.15 mm to 2 mm.

5. The cellular material strip according to claim 1, wherein the first height is 1.5 to 2 mm.

6. The cellular material strip according to claim 1, wherein the second height is 10.5 to 20 mm.

7. The cellular material strip according to claim 1, wherein the second height is 10.5 to 13 mm.

8. The cellular material strip according to claim 1, wherein the short sides of the rectangle have a length of 1 mm to 5 mm.

9. The cellular material strip according to claim 8, wherein the length of the short sides is 2 mm.

10. The cellular material strip according to claim 1, wherein the first short datum line has a length of 1 mm to 10 mm.

11. The cellular material strip according to claim 10, wherein the length of first datum line is 6 mm.

12. The cellular material strip according to claim 10, wherein the first long datum line has a length of 2 mm to 20 mm.

13. The cellular material strip according to claim 12, wherein the length of the first long datum line is 14 to 17 mm.

14. The cellular material strip according to claim 1, wherein the second short datum line has a length of 1 mm to 5 mm.

15. The cellular material strip according to claim 14, wherein the length of the second short datum line is 3 mm.

16. The cellular material strip according to claim 1, wherein a ratio of the first height and the second height is 0.1 to 0.5.

17. The cellular material strip according to claim 16, wherein the ratio is 0.11 to 0.12.

18. The cellular material strip according to claim 1, wherein the adhesive coat completely covers the first short datum line and at least partially covers a lateral surface area of the first trapezoid extending between the first long datum line and the first short datum line.

19. The cellular material strip according to claim 1, wherein the second short datum line is rounded off.

20. The cellular material strip according to claim 1, wherein sides of the first trapezoid between the first long datum line and the first short datum line have curved configurations.

21. The cellular material strip according to claim 1, wherein sides of the second trapezoid between the second long datum line and the second short datum line have curved configurations.

22. The cellular material strip according to claim 21, comprising a curved continuous transition between the short sides of the rectangle and the sides of the second trapezoid.

23. The cellular material strip according to claim 20, comprising a curved continuous transition between the short sides of the rectangle and the sides of the second trapezoid.

* * * * *